(12) United States Patent
Fang et al.

(10) Patent No.: US 11,991,687 B2
(45) Date of Patent: May 21, 2024

(54) REDUCING INTERFERENCE IN WIRELESS NETWORKS

(71) Applicant: ZTE Corporation, Guangdong (CN)

(72) Inventors: Huiying Fang, Guangdong (CN); Bo Dai, Guangdong (CN); Luanjian Bian, Guangdong (CN)

(73) Assignee: ZTE Corporation, Shenzhen (CN)

( * ) Notice: Subject to any disclaimer, the term of this patent is extended or adjusted under 35 U.S.C. 154(b) by 418 days.

(21) Appl. No.: 17/377,017

(22) Filed: Jul. 15, 2021

(65) Prior Publication Data
US 2021/0345368 A1    Nov. 4, 2021

Related U.S. Application Data (63) Continuation of application No. PCT/CN2019/072333, filed on Jan. 18, 2019.

(51) Int. Cl.
*H04W 72/1263* (2023.01)
*H04L 5/00* (2006.01)
*H04W 72/0446* (2023.01)
*H04W 72/0453* (2023.01)
*H04W 72/23* (2023.01)

(52) U.S. Cl.
CPC ....... *H04W 72/1263* (2013.01); *H04L 5/0091* (2013.01); *H04W 72/0446* (2013.01); *H04W 72/0453* (2013.01); *H04W 72/23* (2023.01)

(58) Field of Classification Search
CPC ... H04L 5/0007; H04L 5/0073; H04L 5/0091; H04W 72/0446; H04W 72/0453; H04W 72/1263; H04W 72/23
See application file for complete search history.

(56) References Cited

U.S. PATENT DOCUMENTS

| | | | |
|---|---|---|---|
| 10,541,778 B1* | 1/2020 | Cizdziel | H04L 47/2441 |
| 2014/0112253 A1* | 4/2014 | Nagata | H04L 27/2613 370/328 |
| 2014/0269597 A1* | 9/2014 | Park | H04W 52/262 370/329 |
| 2017/0272222 A1* | 9/2017 | Fröberg Olsson | H04L 5/0023 |
| 2018/0063820 A1* | 3/2018 | Xiong | H04L 5/1469 |
| 2019/0141696 A1 | 5/2019 | Kim et al. | |
| 2019/0173720 A1* | 6/2019 | Xue | H04W 72/0453 |
| 2019/0229840 A1* | 7/2019 | Takeda | H04L 5/0094 |

(Continued)

FOREIGN PATENT DOCUMENTS

| | | |
|---|---|---|
| CN | 108024363 A | 5/2018 |
| WO | 2018021821 A1 | 2/2018 |

OTHER PUBLICATIONS

European Search Report for EP Patent Application No. 19849187.0, dated Jan. 4, 2022, 13 pages.

(Continued)

*Primary Examiner* — Gary Mui
(74) *Attorney, Agent, or Firm* — Perkins Coie LLP (57) ABSTRACT

Methods, systems, and devices related to wireless communication are described. A method of wireless communication includes determining, by a communication device, one or more silent subcarriers among a plurality of subcarriers in a physical resource block (PRB) associated with a communication system; and determining to mute the one or more silent subcarriers in a resource mapping process based on a signaling instruction.

20 Claims, 6 Drawing Sheets

(56) References Cited

U.S. PATENT DOCUMENTS

2019/0364449 A1    11/2019  Yang et al.
2021/0298011 A1*    9/2021  Beale ................... H04L 1/0068
2021/0307042 A1*    9/2021  Shin ..................... H04L 5/0092

OTHER PUBLICATIONS

Sony, "Whether RAN1 enhancements are required for LTE-M / NR coexistence," 3GPP TSG RAN WG1 Meeting #94bis, R1-1810651, Chengdu, China, Oct. 8-12, 2018, 3 pages.

Huawei, et al., "On eMTC co-existence with NR," 3GPP TSG RAN WG1 Meeting #95, R1-1812146, Spokane, USA, Nov. 12-16, 2018, 4 pages.

International Search Report and Written Opinion dated Jul. 23, 2019 for International Application No. PCT/CN2019/072333, filed on Jan. 18, 2019 (7 pages).

LG Electronics, "Discussion on coexistence of LTE-MTC with NR," 3GPP TSG RAN WG1 Meeting #94bis, Chengdu, China, R1-1810234, 4 pages, Oct. 8-12, 2018.

ZTE, "Coexistence of LTE-MTC with NR," 3GPP TSG RAN WG1 Meeting #95, Spokane, U.S.A., R1-1812767, 4 pages, Nov. 12-16, 2018.

CIPO, Office Action for Canadian Application No. 3,127,105, dated Jan. 16, 2023, 4 pages.

CIPO, Notice of Allowance for Canadian Application No. 3,127,105, dated Sep. 19, 2023, 1 page.

KIPO, Office Action for Korean Application No. 10-2021-7025816, dated Sep. 30, 2023, 6 pages with unofficial English summary.

* cited by examiner

REDUCING INTERFERENCE IN WIRELESS NETWORKS

CROSS-REFERENCE TO RELATED APPLICATIONS

This application is a continuation of and claims priority to International Patent Application No. PCT/CN2019/072333, filed on Jan. 18, 2019, the contents of which are incorporated herein by reference in their entirety.

TECHNICAL FIELD

This patent document is directed generally to wireless communications, and more particularly, to a method for reducing interference in wireless networks.

BACKGROUND

Machine Type Communications (MTC), also known as Machine to Machine (M2M) communications, are the primary application forms of the Internet of Things at present stage. Currently, an LTE (Long-Term Evolution)/LTE-A (Long-Term Evolution Advance) based MTC terminal is usually deployed under the same system bandwidth as a legacy LTE/LTE-A terminal. As traditional LTE/LTE-A terminals exit the market, the existing LTE spectrum will be replaced by the 5G new radio system (NR system). Since the LTE/LTE-A based MTC terminal has a service life of at least ten years, the LTE/LTE-A based MTC system (referred to as LTE-MTC system) and the NR system will coexist for a long time.

SUMMARY

The disclosure relates to a method and apparatus for reducing interference between two or more communication systems (e.g., LTE-MTC and NR systems). More particularly, a communication apparatus/device (e.g., a base station) can determine one or more silent subcarriers among a plurality of subcarriers in a physical resource block (PRB) associated with a communication system. The communication apparatus/device can then determine to mute the one or more silent subcarriers in a resource mapping process based on a signaling instruction.

BRIEF DESCRIPTION OF THE DRAWINGS

FIG. 1 illustrates a misalignment of PRBs when two communication systems, LTE-MTC and NR systems, coexist, due to the presence of a direct current (DC) subcarrier. FIG. 1 also illustrates how the present technology address the misalignment by determining an outlying subcarrier as a silent subcarrier and muting the silent subcarrier (by puncturing or not counting the silent subcarrier when performing a rate matching process).

FIG. 2 illustrates a misalignment of PRBs when two communication systems, LTE-MTC and NR systems, coexist, due to channel raster and system parameter differences (e.g., the PRBs of a system may be misaligned with the PRBs of another system) and the presence of a DC subcarrier. FIG. 2 also illustrates how the present technology address the misalignment by determining an outlying subcarrier as a silent subcarrier and muting the silent subcarrier (e.g., by puncturing or not counting the silent subcarrier when performing a rate matching process).

FIG. 3 illustrates how the present technology identifies multiple silent subcarrier and mute the silent subcarrier (by puncturing or not counting the silent subcarrier when performing a rate matching process).

DETAILED DESCRIPTION

The present technology is described in detail below with reference to the drawings in conjunction with the embodiments. It should be noted that the embodiments in the present application and the features in the embodiments can be combined in various combination, with being limited by the disclosed embodiments. Although the embodiments discussed herein use an LTE-MTC system and an NR system as examples, the present technology can be applied to other communication systems.

Since the LTE-MTC system is based on LTE/LTE-A, there is a direct current (DC) subcarrier in the center of the LTE-MTC carriers. However, the NR system does not have a DC subcarrier. Even if the physical resource blocks (PRBs) of the LTE-MTC system and the PRBs of the NR system are aligned at one end, the PRBs of the NR system and the PRBs of the LTE-MTC system may be misaligned due to the presence of the DC subcarrier. In the cases where the PRBs are not aligned, when the LTE-MTC and the NR systems share a system bandwidth, in order to ensure the system performance when both systems coexist, the PRBs of one of the systems are reserved and not utilized, so as to prevent interference at corresponding resource locations of the systems. Therefore, because the PRBs of the two systems are not aligned, in order to avoid interference between the systems, to transmit the PRBs of one system, another system may need to reserve two adjacent PRB resources corresponding to the locations of the PRBs, resulting in low system resource utilization. The present disclosure provides a method for reducing the interference between coexisting systems and for improving the utilization of the system resources, especially in the cases where the PRBs of the coexisting systems are not aligned.

INTRODUCTION

The disclosure relates to a method and apparatus for reducing interference between two or more coexisting communication systems (e.g., share the same spectrum resource) so as to improve resource utilization. The method includes at least one of the following technical features: (1) enabling a silent subcarrier function through Radio Resource Control (RRC) signaling or system information; (2) determining, identifying, or predefining, by a communication device (e.g., a base station), one or more silent subcarriers among a plurality of subcarriers in a physical resource block (PRB) associated with a communication system (e.g., an LTE-MTC or NR system); and (3) determining to mute the silent subcarriers in a resource mapping process based on the type of an information channel or a dynamic signaling instruction. The silent subcarriers can be muted by (a) puncturing the silent subcarrier or (2) not counting the resource elements on the silent subcarrier as available resources (or rate matching around the silent subcarrier) when performing a rate matching process (as defined in the LTE-MTC or NR system).

Further, in some embodiments, the silent subcarrier can be determined or identified based on one or more following parameters or factors: a resource block index (e.g., a PRB index), a narrowband (NB) index, a system bandwidth, a time domain location, and a subcarrier index.

In some embodiments, the determined one or more silent subcarriers can include: (1) N consecutive subcarriers in a single physical resource block or a single resource block (e.g., a virtual resource block); (2) N consecutive subcarriers in a plurality of consecutive physical resource blocks or a plurality of consecutive resource blocks (e.g., virtual resource blocks) across narrowbands; (3) N consecutive subcarriers in a plurality of discrete physical resource blocks or a plurality of discrete resource blocks (e.g., virtual resource blocks) in the same narrowband; (4) N consecutive subcarriers in a plurality of consecutive physical resource blocks or a plurality of discrete resource blocks (e.g., virtual resource blocks) in the same narrowband; and (5) N consecutive subcarriers in all physical resource blocks or all resource blocks (e.g., virtual resource blocks) in a narrowband. "N" represents an integer equal to or greater than 1. The value of "N" can be determined based on specific configurations of the system. In some embodiments, the value of "N" can be determined based on the location of a resource block or a narrowband. In some embodiments, the value of "N" can be determined based on a sequence number of a resource block or a narrowband. In some embodiments, the value of "N" is determined based on RRC signaling or system information. In some embodiments, the value of "N" can be determined dynamically (e.g., N can be adjusted in response to the status of communications) or semi-statically/semi-dynamically (e.g., a "semi-static" configuration; N is preset and remains unchanged for a period).

Further, embodiments associated with using the dynamic signaling instruction to determine whether to mute the silent subcarrier can include the features such as (1) the dynamic signaling instruction can instruct not to mute the identified silent subcarrier(s); (2) the dynamic signaling instruction can instruct to mute all identified silent subcarrier(s) by puncturing the silent subcarrier(s) or by rate matching around the silent subcarrier(s); and (3) the dynamic signaling instruction can instruct to mute a portion of the identified silent subcarriers by puncturing them or rate matching around them.

The "semi-static" configuration mechanisms provided by some embodiments of the present method and apparatus can dynamically determine whether to mute the identified silent subcarrier(s) by puncturing the silent subcarrier(s) or not rate matching the silent subcarriers. As a result, some embodiments of the present method and apparatus can effectively reduce interference between two or more communication systems (e.g., NR system and MTC system) when these systems coexist, so as to improve efficiency of data/signal transmission when two or more communication systems coexist.

Some embodiments of the present technology are described in detail below with reference to the drawings in conjunction with the embodiments. It should be noted that the embodiments in the present application and the features in the embodiments can be combined in various combination, with being limited by the disclosed embodiments. Although the embodiments discussed herein use an LTE-MTC system and an NR system as examples, the present technology can be applied to other communication systems.

Embodiment 1

Figure 1:
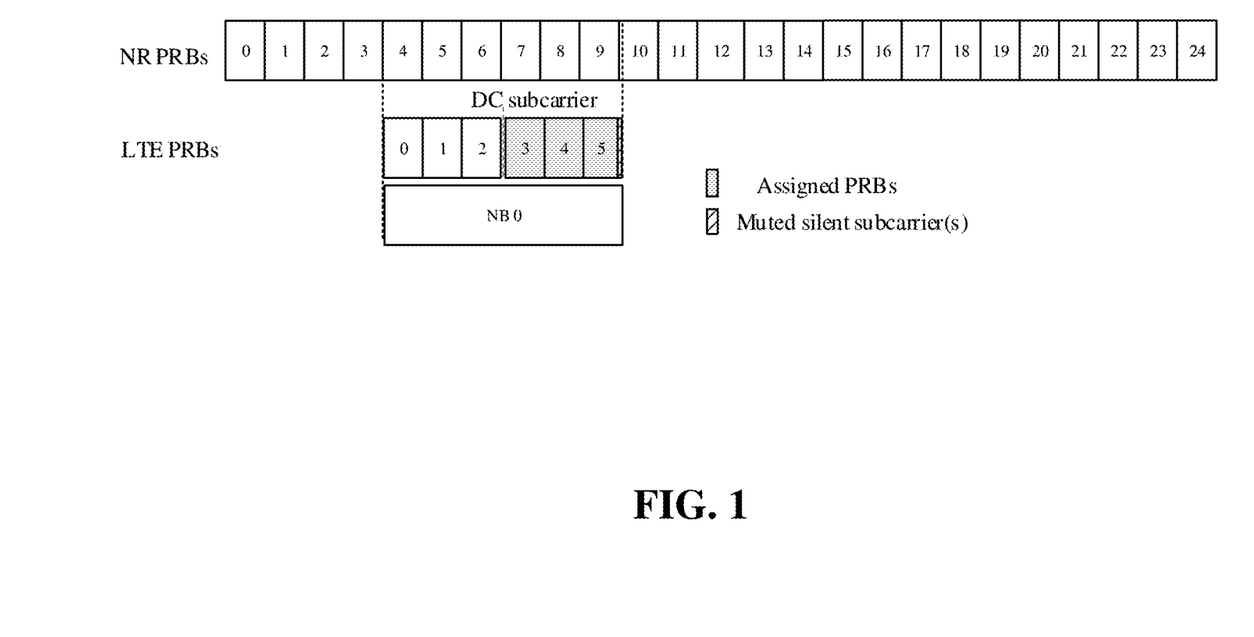
FIG. 1 is a schematic diagram illustrating embodiments in accordance with the present technology. More particularly.

The embodiment described with reference to FIG. 1 is directed to a method for reducing interference between two communication systems, the NR system and the LTE-MTC system. As shown in FIG. 1, the PRBs of the NR system and the PRBs of the LTE-MTC system are misaligned, due to a DC subcarrier. The NR system has 25 PRBs (with sequence numbers 0-24). The LTE-MTC system has 6 PRBs (with sequence numbers 0-6) in a narrowband NB0. As shown, the DC subcarrier is located between PRB No. 2 and PRB No. 3 and accordingly, PRBs No. 3-5 of the LTE-MTC system are misaligned with PRBs No. 7-9 of the NR system, even though PRB No. 0 of the LTE-MTC system is aligned with PRB No. 4 of the NR system.

In the illustrated embodiments, the system bandwidth of the LTE-MTC system is 1.4 MHz, and the system bandwidth of the NR system is 5 MHz. In other embodiments, the system bandwidth can vary due to different communication systems or other suitable configurations.

As shown in FIG. 1, during a resource mapping process (e.g., to determine which PRBs are to be used for data transmission) for the LTE-MTC system and the NR system, some embodiments of the present system (e.g., a base station) can determine a silent subcarrier (or silent subcarriers) in PRB No. 5 of the LTE-MTC system and then mute the identified silent subcarrier. In the illustrated embodiment, the identified silent subcarrier is an outlying silent subcarrier. In other embodiments, the identified/muted silent subcarrier can be other suitable subcarriers.

In some embodiments, the silent subcarriers are the subcarriers predefined/determined/identified by some embodiments of the present system that can be muted, disable, or not to be used for data transmitting. In some embodiments, muting a silent subcarrier can be implemented by puncturing that subcarrier (e.g., dropping the transmission of modulated symbols mapped on the resource elements of that subcarrier) or by rate matching around that subcarrier when mapping resources.

In some embodiments, the outlying silent subcarrier can be one or more subcarriers ("N" subcarriers; "N" represents an integer equal to or greater than 1) with the largest subcarrier index (e.g., the subcarrier with the largest subcarrier index or N subcarriers with the largest index at the edge of the PRB) in the PRB with the largest index (e.g., PRB No. 5 of the LTE-MTC system shown in FIG. 1) among all the PRBs that have been assigned data to transmit (e.g., PRBs No. 3-5 of the LTE-MTC system shown in FIG. 1).

In the embodiment shown in FIG. 1, the misalignment of the NR and LTE-MTC systems is caused by the DC subcarrier located between PRBs No. 2 and No. 3, and therefore for PRBs No. 3-5 (e.g., on the right side of the DC subcarrier), there is one DC subcarrier causing the misalignment.

In some embodiments, the present system can determine whether to mute one or more identified silent subcarriers based on the type of a communication channel associated with the present system. For example, if the communication channel is a control channel, then some embodiments of the present system does not mute the one or more silent subcarriers in the control channel. If the communication channel is a data channel, then some embodiments of the present system can further determine whether to mute the one or more silent subcarriers in the data channel. In some embodiments, when the silent subcarrier function is enabled, the control channel would always mute the identified silent subcarrier whereas the data channel would further dynamically determine whether to mute the identified silent subcarrier.

In some embodiments, for the silent subcarrier(s) in the data channel, the present system can determine whether to mute the silent subcarrier(s) based on a signaling instruction. For example, the LTE-MTC system can dynamically notify the present system (e.g., a base station) regarding the usage status of the outlying silent subcarrier. Accordingly, some embodiments of the present system can determine whether to mute the outlying silent subcarrier.

For example, if the outlying silent subcarrier is being used to transmit data, some embodiments of the present system can determine not to mute that outlying silent subcarrier. In some embodiments, the present system can determine not to mute all the silent subcarriers in assigned data channels (e.g., PRBs No. 3 and 4 of the LTE-MTC system in FIG. 1). In some embodiments, the present system can determine to mute the outlying silent subcarrier(s) in an assigned data channel (e.g., PRB No. 5 of the LTE-MTC system in FIG. 1).

In some embodiments, the present system can include enabling a muting-subcarrier function based on a radio resource control (RRC) signaling (e.g., to single user equipment UE) or system information/messages (e.g., to multiple UEs in the system). In some embodiments, when the muting-subcarrier function is not enabled or activated, the present system does not determine any silent subcarriers. After the muting-subcarrier function is enabled or activated, some embodiments of the present system can (1) determine, by a communication device (e.g., a base station), one or more silent subcarriers among a plurality of subcarriers in one or more PRBs associated with one or more communication systems (e.g., NR and LTE-MTC systems) and (2) determine to mute the one or more silent subcarriers in a resource mapping process based on a signaling instruction.

In some embodiments, once the muting-subcarrier function is enabled or activated, for control channels such as an MTC physical downlink control channel (MPDCCH), the present system can then determine and mute silent subcarriers without further changing the muted silent subcarriers. This approach is called a "semi-dynamic" or "semi-static" approach. In some embodiments, after the muting-subcarrier function is enabled or activated, for data channels, the present system can first determine and mute silent subcarriers and then continuously or periodically monitor the status of the data channels, and accordingly adjust or change the identified/muted silent subcarriers. This approach is called a dynamic approach.

In some embodiments, for the MPDCCH, the present system can (1) not mute (e.g., puncture or rate matching) the subcarriers in resource blocks that are occupied by the MPDCCH; (2) mute "N" subcarriers with greatest sequence numbers in the resource block having the greatest sequence number, among the resource blocks occupied by the MPDCCH; or (3) mute "N" subcarriers with greatest sequence numbers in the resource block having the greatest sequence number in a narrowband (NB), among the resource blocks occupied by the MPDCCH. "N" represents an integer equal to or greater than 1. The value of "N" can be determined based on system configurations (e.g., it can be determined when the muting-subcarrier function is enabled). In some embodiments, the present system can determine the location (e.g., in which NB) of the MPDCCH and the usage of the outlying subcarriers in PRBs based on the alignment of PRBs between coexisting systems.

For data channels, some embodiments of the present system can dynamically monitor the status of the data channels based on dynamic notices regarding the outlying subcarriers (see e.g., Embodiment 1) from the LTE-MTC system. For example, some embodiments of the present system can (1) not mute (e.g., puncture or rate matching) all the subcarriers in the resource blocks that are assigned to the data channels (e.g., PRBs No. 3-5 of the LTE-MTC system shown in FIG. 1); or (2) mute outlying subcarriers in the resource blocks assigned to the data channels.

In some embodiments, the assigned data channel can include, for example, (1) a single PRB or resource block (e.g., virtual resource block); (2) multiple consecutive PRBs or resource blocks across narrowbands; (3) multiple discrete PRBs or resource blocks in the same narrowband; (4) multiple consecutive PRBs or resource blocks in the same narrowband; and (5) all PRBs or resource blocks in a narrowband.

Embodiment 2

Figure 2:
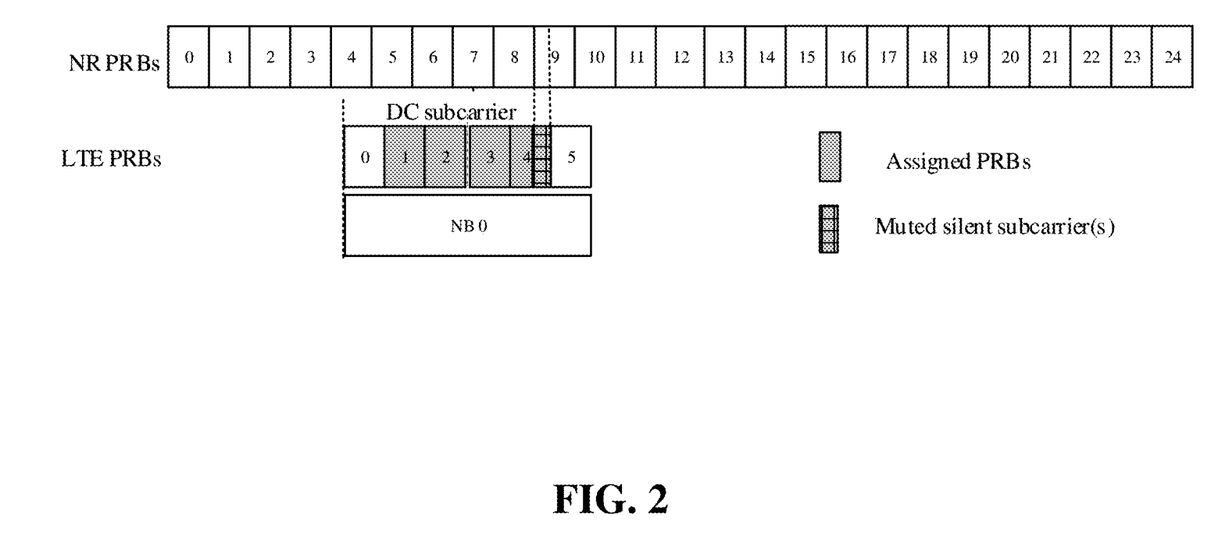
FIG. 2 is a schematic diagram illustrating embodiments in accordance with the present technology. More particularly.

The embodiment described with reference to FIG. 2 is directed to a method for reducing interference between two communication systems, the NR system and the LTE-MTC system. As shown in FIG. 2, the PRBs of the NR system and the PRBs of the LTE-MTC system are misaligned, due to a DC subcarrier. The NR system has 25 PRBs (with sequence numbers 0-24). The LTE-MTC system has 6 PRBs (with sequence numbers 0-6) in a narrowband NB0. As shown, the DC subcarrier is located between PRB No. 2 and PRB No. 3. In the illustrated embodiment, PRB No. 0 of the LTE-MTC system is not aligned with PRB No. 4 of the NR system. Accordingly, PRBs No. 0-5 of the LTE-MTC system are misaligned with PRBs No. 4-9 of the NR system.

In the embodiment shown in FIG. 2, the misalignment of the NR and LTE-MTC systems is caused by (1) the DC subcarrier located between PRBs No. 2 and No. 3 and (2) the misalignment of the PRBs of the NR and LTE-MTC systems (e.g., PRB No. 0 of the LTE-MTC system is not aligned with PRB No. 4 of the NR system). Assume that there are three misaligned subcarriers in the illustrated embodiments shown in FIG. 2 (e.g., one caused by the DC subcarrier and two caused by the misalignment of the PRBs of the NR and LTE-MTC systems), then some embodiments of the present system can determine these three misaligned subcarriers as silent subcarriers.

As discussed above, for different types of channels, some embodiments of the present system can use different approaches (e.g., "dynamic" or "semi-dynamic" approaches) to mute the determined/identified silent subcarriers. For example, for control channels, some embodiments of the present system can use the "semi-dynamic" approach to determine the number of silent subcarriers to be muted via signaling (e.g., to enable the muting-subcarrier function via signaling).

As discussed above, for the MPDCCH, some embodiments of the present system can (1) not mute (e.g., puncture or rate matching) the subcarriers in resource blocks that are occupied by the MPDCCH; (2) mute "N" subcarriers with greatest sequence numbers in the resource block having the greatest sequence number, among the resource blocks occupied by the MPDCCH; or (3) mute "N" subcarriers with greatest sequence numbers in the resource block having the greatest sequence number in a narrowband (NB), among the resource blocks occupied by the MPDCCH. "N" represents an integer equal to or greater than 1. The value of "N" can be determined based on system configurations (e.g., it can be determined when the muting-subcarrier function is enabled).

For the MPDCCH, some embodiments of the present system can use the "semi-static" approach by configuring the number of silent subcarriers to be muted via signaling to set the value of "N" as "3." Namely, in the illustrated embodiment shown in FIG. 2, the number of silent subcarriers to be muted for control channels can be set as "3." In some embodiments, the present system can determine the location (e.g., in which NB) of the MPDCCH and the usage of the outlying subcarriers in PRBs based on the alignment of PRBs between coexisting systems.

For data channels, some embodiments of the present system can dynamically monitor the status of the data channels based on dynamic notices regarding the outlying subcarriers (e.g., one or more subcarriers in the PRB with the largest sequence number (e.g., PRB No. 4 of the LTE-MTC system shown in FIG. 2) among all the PRBs that have been assigned data to transmit) from the LTE-MTC system. For example, some embodiments of the present system can (1) not mute (e.g., puncture or count when rate matching) all the subcarriers in the resource blocks that are assigned to the data channels (e.g., PRB Nos. 1-4 of the LTE-MTC system shown in FIG. 2); or (2) mute outlying subcarriers in the resource blocks assigned to the data channels.

In some embodiments, the assigned data channel can include, for example, (1) a single PRB or resource block (e.g., virtual resource block); (2) multiple consecutive PRBs or resource blocks across narrowbands; (3) multiple discrete PRBs or resource blocks in the same narrowband; (4) multiple consecutive PRBs or resource blocks in the same narrowband; and (5) all PRBs or resource blocks in a narrowband.

Embodiment 3

Figure 3:
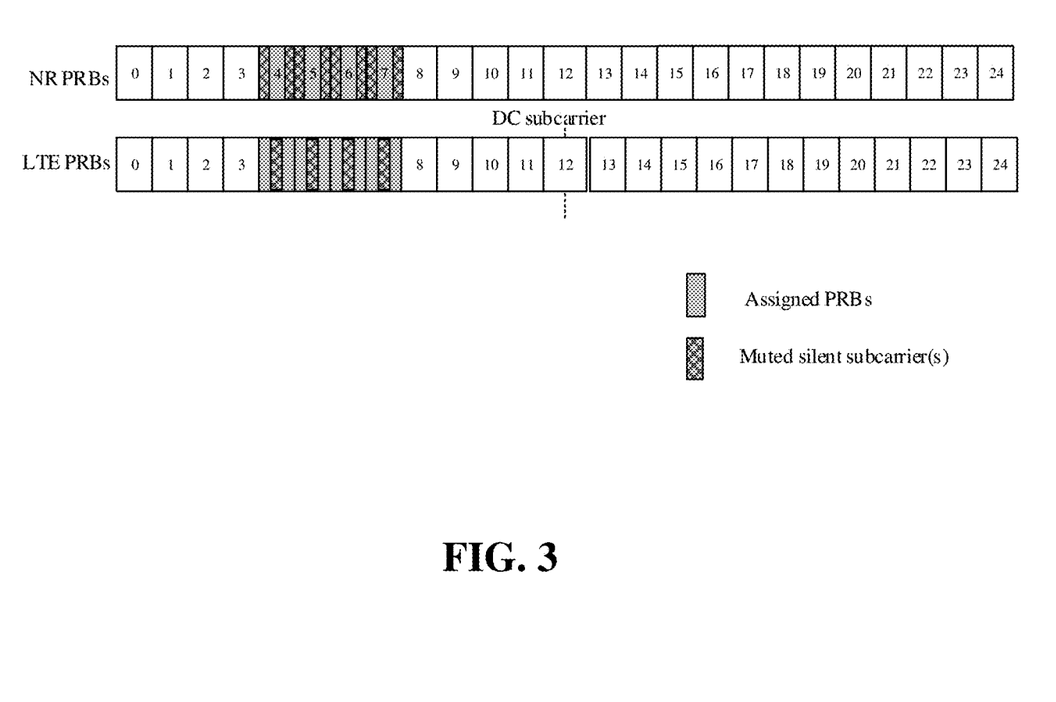
FIG. 3 is a schematic diagram illustrating embodiments in accordance with the present technology. More particularly.

The embodiment described with reference to FIG. 3 is directed to a method for reducing interference between two communication systems, the NR system and the LTE-MTC system. As shown in FIG. 3, the PRBs of the NR system and the PRBs of the LTE-MTC system are misaligned, due to a DC subcarrier. The NR system has 25 PRBs (with sequence numbers 0-24). The LTE-MTC system also has 25 PRBs (with sequence numbers 0-24). As shown, the DC subcarrier is located in PRB No. 12 of the LTE-MTC system. Accordingly, PRBs No. 12-24 of the LTE-MTC system are misaligned with PRBs No. 12-24 of the NR system, even though PRB No. 0 of the LTE-MTC system is aligned with PRB No. 0 of the NR system. PRBs No. 4-7 of the NR system and PRBs No. 4-7 of the LTE-MTC system are assigned for data transmission.

In the illustrated embodiments, for data channels, the NR or LTE-MTC system can dynamically notify the present system regarding the usage status of the data channels. For example, some embodiments of the present system can (1) mute "M1" silent subcarriers in the resource blocks assigned to the data channels in the NR system, and (2) mute "M2" silent subcarriers in the resource blocks assigned to the data channels in the LTE-MTC system. In the illustrated embodiment shown in FIG. 3, the value of "M1" can be "8" (e.g., two silent subcarriers are muted in each of PRBs No. 4-7 of the NR system; the total number is therefore "8"), and the value of "M2" can be "4" (e.g., one silent subcarrier is muted in each of PRBs No. 4-7 of the LTE-MTC system; the total number is therefore "4"). As shown in FIG. 3, the muted silent subcarriers of the NR system (e.g., M1 muted silent subcarriers) "mismatch" the muted silent subcarriers of the LTE-MTC system (e.g., M2 muted silent subcarriers). That means, once a silent subcarrier is muted in the NR system, the corresponding subcarrier can be used by the LTE-MTC system. Similarly, once a silent subcarrier is muted in the LTE-MTC system, the corresponding subcarrier can be used by the NR system. By this arrangement, the present system can effectively reduce interference between the NR and LTE-MTC systems.

For the MPDCCH, some embodiments of the present system can use the "semi-static" approach by configuring the number of silent subcarriers to be muted via signaling. For example, some embodiments of the present system can (1) not mute (e.g., puncture or count when rate matching) the subcarriers in resource blocks that are occupied by the MPDCCH; or (2) mute "M" subcarriers with greatest sequence numbers in the resource block having the greatest sequence number, among the resource blocks occupied by the MPDCCH. The value of "M" can be determined via signaling.

Embodiment 4

This embodiment provides a method for reducing interference. The method can be used to reduce the interference when the PRBs of the NR system and the LTE-MTC system coexist. The method includes, for example, (1) predefining or predetermining the location of one or more silent resources (e.g., one resource can have one or more subcarriers); (2) when there is only one silent resource, determining whether to mute the silent resource via downlink control information (DCI) dynamic signaling (e.g., in this case, 1 bit information in DCI can be used to indicate whether to mute the silent resource); and (3) when there are two or more puncturing resources, determining whether to mute the silent resources and the location of the silent resources via DCI dynamic signaling. In some embodiments, the DCI discussed herein is not a dedicated DCI. The DCI can be used for resource assignment (e.g., signaling resource allocation information) to the same UE. In some embodiments, for 2 silent resources, 2-bit information can be used to signaling whether and how to puncture the silent resources. For example, "00" indicates not muting, "01" indicates muting silent resource #1, "10" indicated muting silent resource #2, and "11" indicates muting silent resource #1 and #2. The 2-bit information can be signaled along with the resource assignment information in the DCI to the UE. For example, the 1-bit or 2-bit information can be added to the existing DCI to indicate whether/how to mute silent resources.

For example, if the location of two puncturing resources is predefined, then DCI dynamic signaling can instruct the present system to (1) puncture only one of the two puncturing resources; or (2) puncture both of the two puncturing resources. In some embodiments, the DCI dynamic signaling for determining whether to puncture can be enabled via RRC signaling or system information/messages.

Embodiment 5

This embodiment provides a method for reducing interference. The method can be used to reduce the interference when the PRBs of the NR system and the LTE-MTC system coexist. The method includes, for example, (1) predefining or predetermining the location of one or more silent resources; (2) muting the silent resources based on RRC signaling or system information/messages (e.g., when the RRC signaling or system information enables a muting function, some embodiments of the present system then punctures the silent resources). Alternatively, the method can include not counting the silent resources when rate matching based on the RRC signaling or system information/messages (e.g., when the RRC signaling or system information enables a muting function, some embodiments of the present system then always does not count or avoid the silent resources when rate matching).

Embodiment 6

This embodiment provides a method for reducing interference. The method can be used to reduce the interference when the PRBs of the NR system and the LTE-MTC system coexist. The method includes, for example, (1) determining the location of one or more silent resources based on a PRB index and system bandwidth; (2) muting the silent resources, determined based on the on PRB index and system bandwidth, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching).

Embodiment 7

This embodiment provides a method for reducing interference. The method can be used to reduce the interference when the PRBs of the NR system and the LTE-MTC system coexist. The method includes, for example, (1) determining the location of one or more silent resources based on a PRB index; (2) muting the silent resources, determined based on the on the PRB index, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching). In some embodiments, when determining the location of one or more silent resources based on a PRB index, for example, the silent resources can be on the PRBs with the PRB index larger than a predefined threshold.

Embodiment 8

This embodiment provides a method for reducing interference. The method can be used to reduce the interference when the PRBs of the NR system and the LTE-MTC system coexist. The method includes, for example, (1) determining the location of one or more silent resources based on a PRB index, system bandwidth, and/or time domain location; (2) muting the silent resources, determined based on the on the PRB index system bandwidth, and/or time domain location, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching).

In some embodiments, the silent resources are in a portion of the time domain locations. In some embodiments, the silent resources are in all of the time domain locations. In some embodiments, the silent resources in different time domain locations are the same. In some embodiments, the silent resources in different time domain locations are different.

Embodiment 9

This embodiment provides a method for reducing interference. The method can be used to reduce the interference when the PRBs of the NR system and the LTE-MTC system coexist. The method includes, for example, (1) determining the location of one or more silent resources based on a narrowband index; (2) muting the silent resources, determined based on the on narrowband, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching). In some embodiments, when determining the location of one or more silent resources based on a narrowband index, for example, the silent resources can be on a narrowband with the narrowband index larger than a predefined threshold.

Embodiment 10

This embodiment provides a method for reducing interference. The method can be used to reduce the interference when the PRBs of the NR system and the LTE-MTC system coexist. The method includes, for example, (1) determining the location of one or more silent resources based on a narrowband index and system bandwidth; (2) muting the silent resources, determined based on the narrowband index and system bandwidth, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching).

Embodiment 11

This embodiment provides a method for reducing interference. The method can be used to reduce the interference when the PRBs of the NR system and the LTE-MTC system coexist. The method includes, for example, (1) determining the location of one or more silent resources based on a narrowband index and/or system bandwidth and time domain location; (2) muting the silent resources, determined based on the narrowband index and/or system bandwidth and time domain location, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching).

In some embodiments, the silent resources are in a portion of the time domain locations. In some embodiments, the silent resources are in all of the time domain locations. In some embodiments, the silent resources in different time domain locations are the same. In some embodiments, the silent resources in different time domain locations are different.

Embodiment 12

This embodiment provides a method for reducing interference. The method can be used to reduce the interference when the PRBs of the NR system and the LTE-MTC system coexist. The method includes, for example, (1) determining the location of one or more silent resources based on RRC signaling; (2) muting the silent resources, determined by semi-static RRC signaling, according to RRC signaling or system information/messages (e.g., when the RRC signaling or system information enables a muting function, some embodiments of the present system then punctures the silent resources). Alternatively, the method can include not counting the silent resources when rate matching according to the RRC signaling or system information/messages (e.g., when the RRC signaling or system information enables a muting function, some embodiments of the present system then always does not count or avoid the silent resources when rate matching).

Embodiment 13

This embodiment provides a method for reducing interference. The method can be used to reduce the interference when the PRBs of the NR system and the LTE-MTC system coexist. The method includes, for example, (1) determining the location of one or more silent resources based on RRC signaling; (2) enabling the muting-subcarrier function by semi-static RRC signaling; and (3) muting the silent resource by DCI dynamic signaling (e.g., when the RRC signaling or system information enables a muting function, and dynamic DCI signaling indicated to mute the silent resource, some embodiments of the present system then mute the silent resources).

Figure 4:
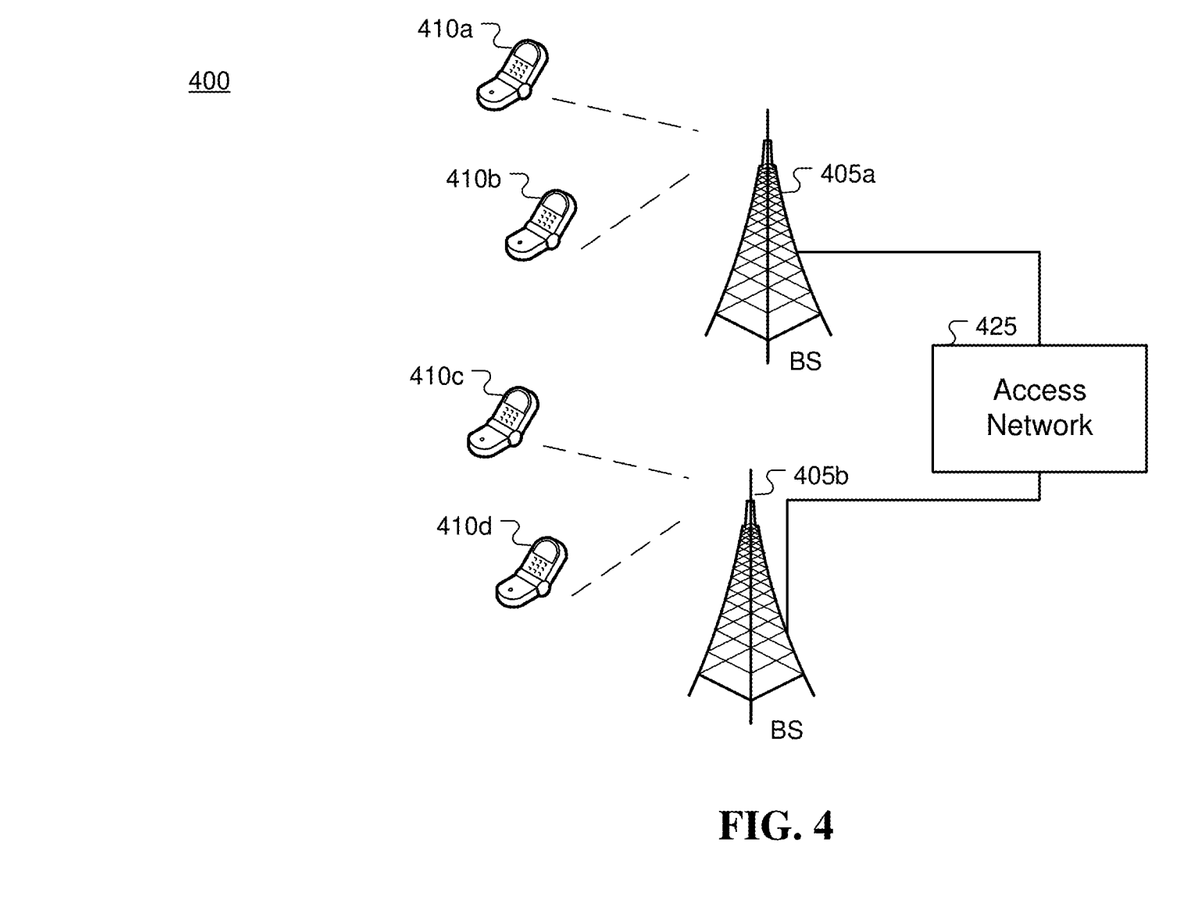
FIG. 4 is a schematic diagram showing a wireless communication system in accordance with embodiments of the present technology.

FIG. 4 shows an example of a wireless communication system 400 where techniques in accordance with one or more embodiments of the present technology can be applied. The wireless communication system 400 can include one or more base stations (BSs) 405a, 405b, one or more wireless devices (e.g., UE or terminals) 410a, 410b, 410c, 410d, and an access network 425. The base stations 405a, 405b can provide wireless service to wireless devices 410a, 410b, 410c and 410d in one or more wireless sectors. In some implementations, the base stations 405a, 405b include directional antennas to produce two or more directional beams so as to provide wireless coverage in different sectors.

The access network 425 can communicate with one or more of the base stations 405a, 405b. In some implementations, the access network 425 is in communication with a core network (not shown in FIG. 4) that provides connectivity with other wireless communication systems and wired communication systems. The core network can include one or more service subscription databases to store information related to the subscribed wireless devices 410a, 410b, 410c and 410d. In some embodiments, the base station 405a can provide wireless service based on a first radio access technology (e.g., based on LTE-MTC system), whereas the base station 405b can provide wireless service based on a second radio access technology (e.g., based on NR system). In some embodiments, the base stations 405a, 405b can provide wireless service based on both the first radio access technology and the second radio access technology. The base stations 405a and 405b may be co-located or may be separately installed in the field according to the deployment scenario. The access network 425 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
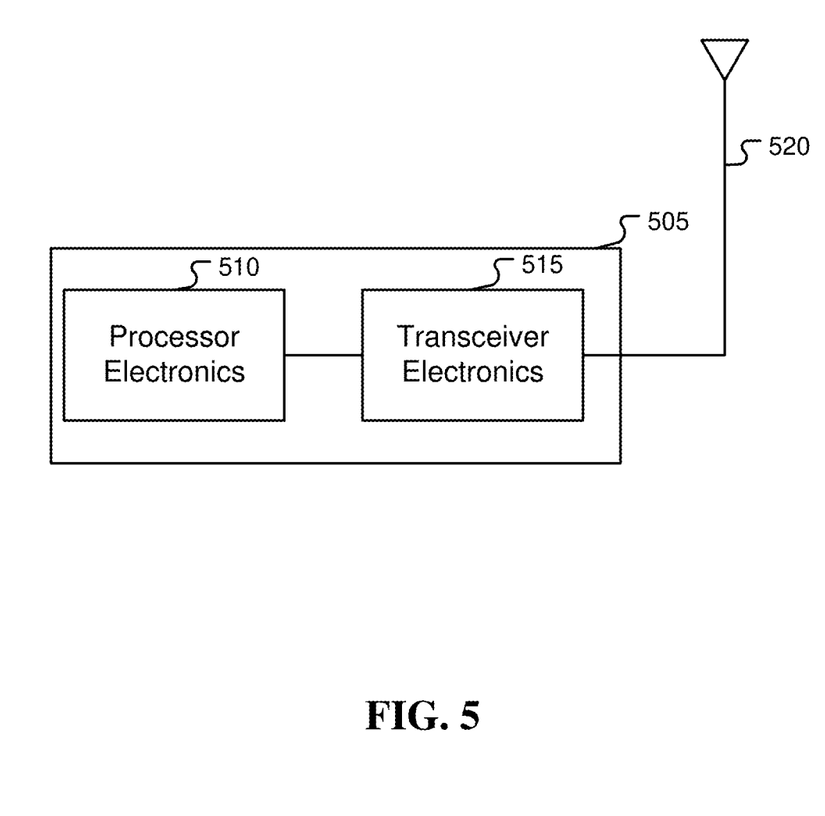
FIG. 5 is a block diagram illustrating a radio station in accordance with embodiments of the present technology.

FIG. 5 is a block diagram representation of a portion of a radio station (e.g., a type of wireless communication node). A radio station 505 such as a base station or a terminal (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. The radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

Figure 6:
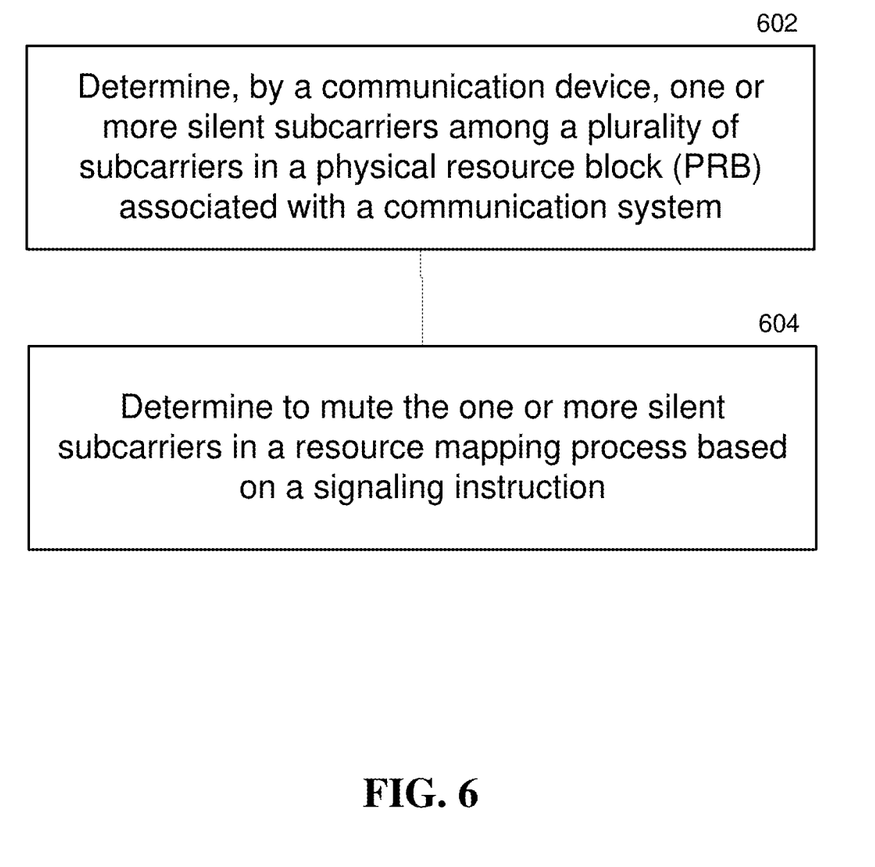
FIG. 6 is a flowchart illustrating a method in accordance with embodiments of the present technology.

FIG. 6 shows a flowchart of an example method 600 of wireless communication. The method 600 includes determining (block 602), by a communication device, one or more silent subcarriers among a plurality of subcarriers in a physical resource block (PRB) associated with a communication system. For examples, as described in Embodiments 1-11 above in detail, the present system can determine which subcarriers can be determined as the silent subcarrier(s) and the location of the what the silent subcarrier(s) (e.g., in which PRB or NB and its sequence number).

The method 600 includes determining (block 604) to mute the one or more silent subcarriers in a resource mapping process based on a signaling instruction. In some embodiments, the communication system includes a new-radio (NR) system. In some embodiments, the communication system includes a machine-type-communications (MTC) system. For examples, as described in Embodiments 1-11 above in detail, the present system can mute the determined silent subcarriers when mapping resources (e.g., determine which PRBs are used for which data/control channels).

In some embodiments, the method 600 further includes determining to mute the one or more silent subcarriers in the resource mapping process based on the type of a communication channel associated with the communication system.

In some embodiments, the method 600 further includes muting the one or more silent subcarriers by punctuating the one or more silent subcarriers. In some embodiments, the method 600 further includes muting the one or more silent subcarriers by performing a rate matching process. In some embodiments, the method 600 further includes enabling a muting-subcarrier function based on a radio resource control (RRC) signaling or system information. In some embodiments, the method 600 further includes determining the one or more silent subcarriers after enabling the muting-subcarrier function.

In some embodiments, the method 600 further includes determining the one or more silent subcarriers based on a PRB index. In some embodiments, the method 600 further includes determining the one or more silent subcarriers based on a narrowband (NB) index. In some embodiments, the method 600 further includes determining the one or more silent subcarriers based on a system bandwidth. In some embodiments, the method 600 further includes determining the one or more silent subcarriers based on a time domain location. In some embodiments, the method 600 further includes determining the one or more silent subcarriers based on a subcarrier index.

In some embodiments, the one or more silent subcarrier are first silent subcarriers, and the method 600 further comprises determining one or more second silent subcarriers among the plurality of subcarriers in the PRB associated with the communication system.

In some embodiments, the one or more silent subcarriers are first silent subcarriers, and the PRB is a first PRB. In some embodiments, the method further comprises determining one or more second silent subcarriers among a plurality of subcarriers in a second PRB associated with the communication system.

In some embodiments, the one or more silent subcarriers are first silent subcarriers, the PRB is a first PRB, and the communication system is a first communication system. The method further comprises determining one or more second silent subcarriers among a plurality of subcarriers in a second PRB associated with a second communication system.

In some embodiments, the first communication system includes an NR system, and wherein the second communication system includes an MTC system. In some embodiments, the silent subcarrier is an outlying subcarrier.

In some embodiments, the method 600 can be implemented in an apparatus or a device for wireless communication. In some embodiments, the method 600 can be implemented as instructions or code stored in a non-transitory computer readable medium. The code, when executed by a processor, can cause the processor to implement the method 600.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   determining, by a base station, one or more silent subcarriers among a plurality of subcarriers in a physical resource block (PRB) associated with a communication system; and
   transmitting, to a user equipment, a signaling that instructs whether to mute the one or more silent subcarriers, wherein the signaling instructs whether to mute the one or more silent subcarriers when a muting-subcarrier function is enabled and in response to the one or more silent subcarriers being in the data channel, wherein at least one subcarrier of a set of PRBs located on one side of a direct current (DC) subcarrier is muted, and at least one subcarrier of another set of PRBs located on another side of the DC subcarrier is not muted.

2. The method of claim 1, further comprising:
enabling the muting-subcarrier function through a radio resource control (RRC) signaling or system information.

3. The method of claim 1, wherein the one or more silent subcarriers are determined based on any one or more of a PRB index, a narrowband (NB) index, a system bandwidth, a time domain location, and a subcarrier index.

4. The method of claim 1, further comprising indicating a number of one or more silent resources by radio resource control (RRC) signaling, wherein each of the one or more silent resources includes the determined one or more of silent subcarriers.

5. The method of claim 4, wherein the number of the one or more silent resources equals to two or more, a downlink control information (DCI) signaling includes at least 2 bits information for indicating location of the silent resources and whether to mute each of the silent resources.

6. A method of wireless communication, comprising:
receiving, by a user equipment from a base station, a signaling that instructs whether to mute one or more silent subcarriers associated with a communication system,
wherein the signaling instructs whether to mute the one or more silent subcarriers when a muting-subcarrier function is enabled and in response to the one or more silent subcarriers being in the data channel,
wherein at least one subcarrier of a set of PRBs located on one side of a direct current (DC) subcarrier is muted, and at least one subcarrier of another set of PRBs located on another side of the DC subcarrier is not muted; and
receiving data, by the user equipment from the base station, on available resources based on the signaling, wherein the available resources are resources that have been assigned to the user equipment and that are not silent subcarriers.

7. The method of claim 6, further comprising:
enabling the muting-subcarrier function from a radio resource control (RRC) signaling or system information.

8. The method of claim 7, wherein the one or more silent subcarriers are determined to be muted according to the RRC signaling.

9. The method of claim 7, further comprising:
receiving a number of one or more silent resources by the RRC signaling, wherein each of the one or more silent resources include the one or more silent subcarriers.

10. The method of claim 6, wherein the one or more silent subcarriers are determined to be muted via a downlink control information (DCI) signaling.

11. The method of claim 6,
wherein the one or more silent subcarriers are determined based on any one or more of a PRB index, a narrowband (NB) index, a system bandwidth, a time domain location, and a subcarrier index.

12. An apparatus for wireless communication comprising a processor configured to perform a method comprising:

determine, by a base station, one or more silent subcarriers among a plurality of subcarriers in a physical resource block (PRB) associated with a communication system; and transmit, to a user equipment, a signaling that instructs whether to mute the one or more silent subcarriers,
wherein the signaling instructs whether to mute the one or more silent subcarriers when a muting-subcarrier function is enabled and in response to the one or more silent subcarriers being in the data channel,
wherein at least one subcarrier of a set of PRBs located on one side of a direct current (DC) subcarrier is muted, and at least one subcarrier of another set of PRBs located on another side of the DC subcarrier is not muted.

13. The apparatus of claim 12, wherein the processor is further configured to:
enable the muting-subcarrier function through a radio resource control (RRC) signaling or system information.

14. The apparatus of claim 12, wherein the one or more silent subcarriers are determined based on any one or more of a PRB index, a narrowband (NB) index, a system bandwidth, a time domain location, and a subcarrier index.

15. An apparatus for wireless communication comprising a processor configured to perform a method comprising:
receive, by a user equipment from a base station, a signaling that instructs whether to mute one or more silent subcarriers associated with a communication system,
wherein the signaling instructs whether to mute the one or more silent subcarriers when a muting-subcarrier function is enabled and in response to the one or more silent subcarriers being in the data channel,
wherein at least one subcarrier of a set of PRBs located on one side of a direct current (DC) subcarrier is muted, and at least one subcarrier of another set of PRBs located on another side of the DC subcarrier is not muted; and
receive data, by the user equipment from the base station, on available resources based on the signaling, wherein the available resources are resources that have been assigned to the user equipment and that are not silent subcarriers.

16. The apparatus of claim 15, wherein the processor is further configured to:
enable the muting-subcarrier function from a radio resource control (RRC) signaling or system information.

17. The apparatus of claim 16, wherein the one or more silent subcarriers are determined to be muted according to the RRC signaling.

18. The apparatus of claim 15,
the one or more silent subcarriers are determined based on any one or more of a PRB index, a narrowband (NB) index, a system bandwidth, a time domain location, and a subcarrier index.

19. The apparatus of claim 15, wherein the one or more silent subcarriers are determined to be muted via a downlink control information (DCI) signaling.

20. The apparatus of claim 15, wherein the processor is further configured to:
receive a number of one or more silent resources by the RRC signaling, wherein each of the one or more silent resources include the one or more silent subcarriers.

* * * * *